(12) United States Patent
Rich, Sr.

(10) Patent No.: US 6,924,049 B2
(45) Date of Patent: Aug. 2, 2005

(54) ELECTROLYSIS FUEL CELL ENERGY PLANT

(76) Inventor: Joe G. Rich, Sr., 16442 NE. 34th Ave., North Miami Beach, FL (US) 33169

(*) Notice: Subject to any disclaimer, the term of this patent is extended or adjusted under 35 U.S.C. 154(b) by 335 days.

(21) Appl. No.: 09/950,091

(22) Filed: Sep. 10, 2001

(65) Prior Publication Data

US 2002/0102446 A1 Aug. 1, 2002

Related U.S. Application Data

(60) Provisional application No. 60/231,804, filed on Sep. 11, 2000.

(51) Int. Cl.⁷ .......................... H01M 8/00; H01M 8/04; H01M 8/12; H01M 8/18
(52) U.S. Cl. .............................. 429/21; 429/12; 429/13; 429/14; 429/17; 429/26; 204/DIG. 4
(58) Field of Search .............................. 429/12, 13, 14, 429/17, 21, 26; 204/DIG. 4

(56) References Cited

U.S. PATENT DOCUMENTS

| | | | | |
|---|---|---|---|---|
| 2,384,463 A | * | 9/1945 | Gunn et al. ..................... | 429/15 |
| 3,180,813 A | * | 4/1965 | Wasp et al. .................. | 205/343 |
| 4,276,145 A | * | 6/1981 | Skala .......................... | 204/247 |
| 4,322,270 A | * | 3/1982 | Skala .......................... | 205/343 |
| 4,839,013 A | * | 6/1989 | Lohrberg et al. ........... | 204/258 |
| 4,910,101 A | * | 3/1990 | Mitsuda et al. ............... | 429/38 |
| 4,971,675 A | * | 11/1990 | Rogov et al. ................ | 204/212 |
| 5,306,577 A | * | 4/1994 | Sprouse ....................... | 429/17 |
| 5,496,659 A | * | 3/1996 | Zito ........................... | 429/105 |
| 5,510,202 A | * | 4/1996 | McCoy ......................... | 429/19 |
| 6,461,751 B1 | * | 10/2002 | Boehm et al. ................ | 429/13 |
| 6,833,207 B2 | * | 12/2004 | Joos et al. ..................... | 429/19 |

FOREIGN PATENT DOCUMENTS

EP        0 181 134        * 5/1986        ............ H01M/8/06

* cited by examiner

Primary Examiner—Michael Barr
Assistant Examiner—Robert Hodge
(74) Attorney, Agent, or Firm—Robert M. Schwartz; Werner H. Stemer

(57) ABSTRACT

A fuel cell device for providing electrical energy, the fuel cell device comprising a first storage tank for storing a hydrogen-based fuel, a second storage tank for storing an oxidant, a fuel cell portion having an electron input, an electrolysis portion having an electron output, and an electrolyte recovery unit. A method for generating electrical energy using a fuel cell device having a fuel cell portion and an electrolysis portion is also provided.

26 Claims, 4 Drawing Sheets

ELECTROLYSIS FUEL CELL ENERGY PLANT

CROSS-REFERENCES TO RELATED APPLICATIONS

This application claims the benefit of U.S. Provisional Application No. 60/231,804, filed on Sep. 11, 2000, entitled ELECTROLYSIS FUEL CELL ENERGY PLANT

TECHNICAL FIELD

The present invention relates generally to a fuel cell device for providing energy. More specifically, the present invention relates to a fuel cell device that provides electrical energy and incorporates an electrolysis portion to at least partially recycle fuel cell reactants from fuel cell waste water and enables electrolyte recovery.

BACKGROUND OF THE INVENTION

Electrical power systems are nonlinear systems that are large and quite complex. Their limited available control and generally sluggish dynamic response complicate these power systems. Moreover, the magnitude of these power systems does not easily provide for a rapid control response to disturbances. Restoring a system to its pre-disturbance level can take hours. Furthermore, as a result of the increasing social and environmental costs of installing transmission lines, transmission systems will be driven closer to their limits. The difficulty in controlling these power systems will only increase with their heavy loads.

Power systems in the United States are already being pushed more heavily now than ever before. Recent events on the West Coast demonstrate potential nationwide problems. The United States' power transmission infrastructure is encountering a variety of new demands that it was never designed to meet. At the same time, major componentry of the systems are nearing the end of their design lifetime. A major investment in rebuilding the power transmission infrastructure will be required, as well as the development of new technologies, in order to get the maximum utilization out of the existing plants at a lower cost.

Power flow from one point to another within an interconnected system obeys Kirchhoff's Laws. Current is divided between parallel pathways leading to the identical destination. Unfortunately, pathways running parallel to the desired paths may be owned or operated by separate entities, or may already be loaded to capacity. Control of the loop flows is presently accomplished through the use of phase shifting transformers and series capacitors. These devices lack the ability to be rapidly adjusted, a significant detriment in a field where flows of power may quickly be altered. The tremendous increase in the use of retail wheeling and contracted power transfers requires a substantially increased ability to determine the pathways taken by power flows.

Fuel cells have been known for over 150 years, and are currently positioned to make substantial contributions in the field of stationary power generation. Ludwig Mond and Charles Langer, who attempted to build the first practical fuel cell device using air and industrial coal gas, coined the term "fuel cell." Early attempts to build fuel cells for converting coal or carbon directly into electricity failed as a result of a dearth of knowledge regarding materials and the kinetics of electrodes.

The first successful fuel cell devices resulted from inventions that improved on the previously employed expensive platinum catalysts with a hydrogen-oxygen cell utilizing a less corrosive alkaline electrolyte and inexpensive nickel electrodes. However, the technical challenges were discouraging and it was not until the 1950's that fuel cell systems showed promise as energy sources with significant output. At that time, the National Aeronautics and Space Administration (NASA) turned to fuel cells for compact electricity generators to provide onboard power for manned space missions.

Generally, fuel cell devices produce electricity by combining hydrogen ions that are derived from a hydrogen-containing fuel with oxygen atoms. Unlike batteries, which provide the fuel and oxidizer internally and must be recharged periodically, fuel cells utilize a supply of ingredients from an outside source and produce power so long as the fuel supply is maintained. By continuously changing the chemical energy of a fuel source, such as hydrogen gas, and oxidant, such as oxygen or air, to electrical energy, a typical fuel cell device generates electricity. This process does not consume the fuel to produce heat; hence the thermodynamic limits on efficiency are much higher than the traditional power generation processes. A fuel cell generally consists of two catalytic electrodes separated by an ion-conducting membrane. The hydrogen fuel is ionized on one electrode, and the subsequent hydrogen ions diffuse across the membrane to interact with the oxygen ions on the surface of the other electrode. If current flow is prohibited from one electrode to the other, a potential gradient develops, stopping the diffusion of the hydrogen ions. Permitting current to flow from one electrode to the other through an external load creates power.

The membrane that separates the electrodes ideally provides for the diffusion of ions from one electrode to the other, and additionally keeps the fuel and oxidant gases apart. The membrane prevents the flow of electrons, as well as the diffusion of the fuel or oxidant gases, to reduce the possibility of explosions and other unintended consequences. If electrons pass through the membrane, the device is shorted out, thus eliminating or reducing the useful power formed by the fuel cell.

A fuel cell having catalytic electrodes in close contact with the membrane material reduces the contact resistance that occurs when the ions move between the catalytic electrode and the membrane. The aforementioned close contact can be accomplished by incorporating the membrane material into the electrodes.

The fuel cell facilitates chemical reactions that produce either hydrogen- or oxygen-bearing ions at one of the electrodes of the cell. The ions then pass through an electrolyte, such as phosphoric acid or carbonate, and react with oxygen atoms. This interaction results in an electric current at both electrodes, and produces heat and water vapor as waste products. The strength of the electric current is proportional to the surface area of the electrodes. The voltage of a fuel cell is limited electrochemically to approximately 1.23 volts per electrode pair. Thus, fuel cells then can be stacked until the desired power level is reached.

One of the major challenges in developing practical applications for fuel cells has been to improve the economics through the use of low-cost components with acceptable component life and performance. As a result, fuel cells are distinguishable by the type of electrolyte used. In the realm of stationary power generation, the conventional types of fuel cells use phosphoric acid, carbonate, or solid oxide as electrolytes. Differentiation between fuel cell approaches is found in the type of electrolyte used.

The phosphoric acid approach is the most established of the approaches. Platinum is required as a catalyst for the electrodes. Conversion of the natural gas, known as reforming, used as fuel to a hydrogen-rich gas the system requires occurs outside the fuel cell stacks. The system complexity of this approach yields capital costs that are higher and efficiencies that are lower than those for the two other approaches.

The carbonate approach operates at higher temperatures, at or slightly above ambient pressure, and uses less expensive, nickel-based electrodes than the phosphoric acid approach. Reforming can occur inside the fuel cell stacks. The major difficulties with carbonate technology include (1) the complexity of working with a liquid electrolyte rather than a solid and (2) the carbonate ions from the electrolyte are used up in the reactions at the anode, making it necessary to compensate by injecting carbon dioxide at the cathode.

The solid oxide approach is the least developed of these approaches. It uses a coated zirconia ceramic as the electrolyte. The electrochemical conversion process occurs at extremely high temperatures, sustaining internal reforming. The fuel cells may be either flat plates or tubular in shape. Unresolved manufacturing difficulties with all-ceramic construction in mass producing these fuel cells hampers this approach.

Additionally, a proton exchange membrane, also known as a polymer electrolyte membrane, fuel cell approach has been postulated for submegawatt stationary power plant applications. The proton exchange membrane allows protons to flow through, but prohibits the passage of electrons. As a result, while the electrons flow through an external circuit, the hydrogen ions flow directly through the proton exchange membrane to the cathode, where they combine with oxygen molecules and the electrons to form water. A fuel cell under this approach operates at 175° F., uses a platinum catalyst, and is susceptible to poisoning by carbon monoxide and other impurities.

It is thus an object of the present invention to provide a fuel cell energy plant that has improved efficiency through a combination of a fuel cell portion and an electrolysis portion. The fuel cell portion combines hydrogen and oxygen to produce electricity, forming water as a waste product that is then split by the electrolysis potion to form hydrogen and oxygen. The hydrogen and oxygen is sent back to the fuel cells for reuse.

Therefore, a continuing need exists for a fuel cell energy plant that overcomes the efficiency problems existing in prior fuel cell systems, including but not limited to fuel usage, by coupling a fuel cell portion to an electrolysis portion.

SUMMARY OF THE INVENTION

The present invention eliminates the above-mentioned needs by providing a fuel cell device for generating electrical energy through the combination of a hydrogen-based fuel with an oxidant in the presence of an electrical charge. The water subsequently produced as a waste product is at least partially recycled into hydrogen and oxygen, to be reused as fuel and oxidant, respectively. Thus, the present invention obtains a heightened overall efficiency that approaches one hundred percent recycling of the fuel and oxidant.

In accordance with the present invention, there is provided a fuel cell device for providing electrical energy. The fuel cell device includes a first storage tank for storing a hydrogen-based fuel and a second storage tank for storing an oxidant. The fuel cell device further includes a fuel cell portion having an electron input from an external load. The electron input provides a pathway for electrons to pass through the fuel cell portion and into the electrolysis portion. The electrolysis portion has an electron output to provide a pathway for electrons to leave the fuel cell device. An electrolyte recovery unit is provided to redirect electrolyte overflow. The electrolyte overflow is redirected back into the electrolysis portion or into a third storage tank for future use.

The present invention is further directed to a method for generating electrical energy using a fuel cell device having a fuel cell portion and an electrolysis portion. The method includes the storing of a hydrogen-based fuel in a first storage tank and storing an oxidant in a second storage tank. The hydrogen-based fuel, oxidant, and electrons are supplied to the fuel cell portion, resulting in the combination of the hydrogen-based fuel and oxidant. This combination generates electrical energy and waste water. The waste water is supplied to the electrolysis portion having an electrolyte and is split into hydrogen and oxygen. The hydrogen from the electrolysis portion is supplied to the first storage tank and the oxygen from the electrolysis portion is supplied to the second storage tank. The electrolysis portion provides flow of the electrolyte to an electrolyte recovery pump, the flow being redirected.

DETAILED DESCRIPTION

Figure 1:
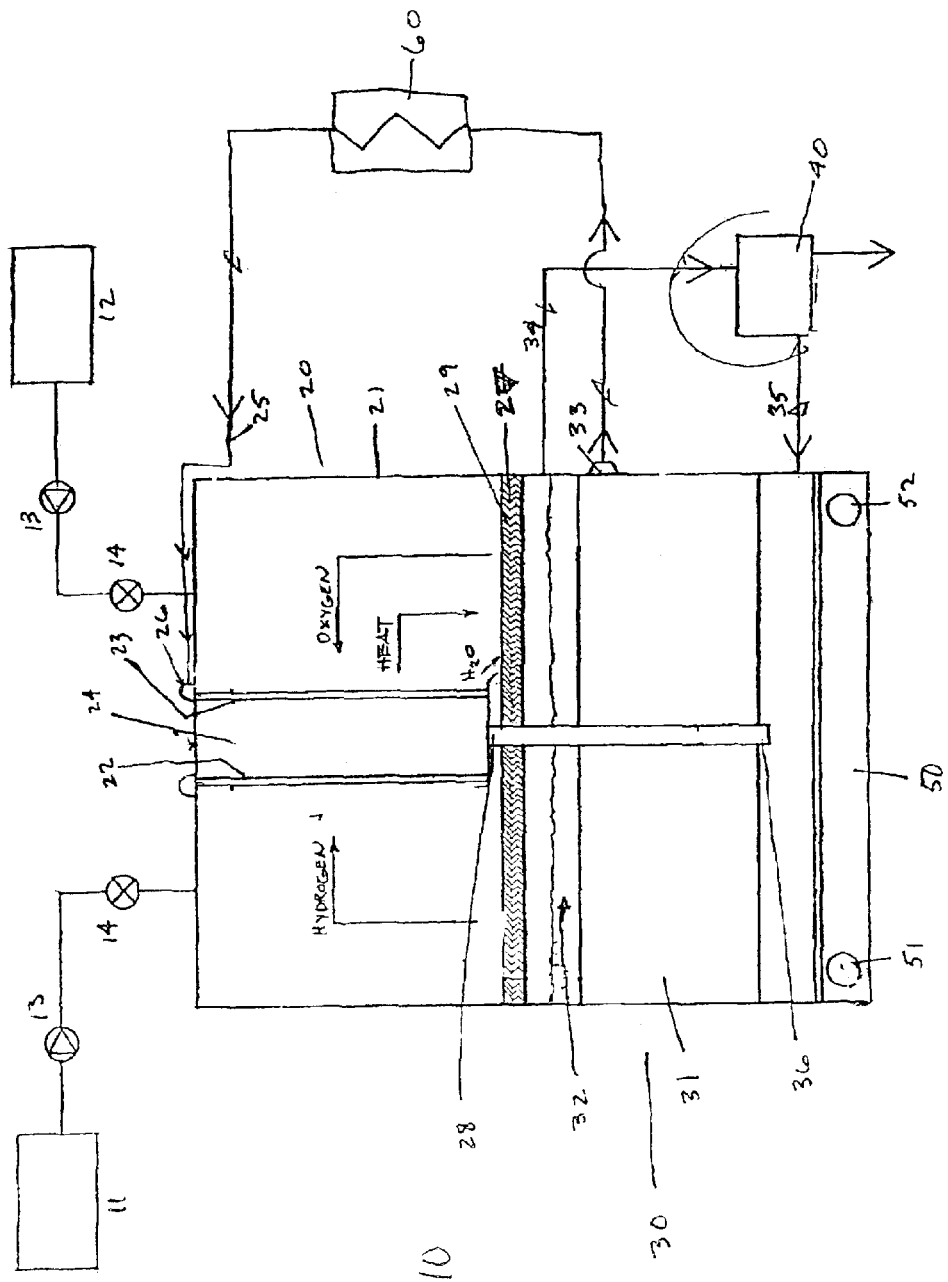
FIG. 1 is an illustration of a flow block diagram of the process by which the fuel cell device of the present invention creates electrical power.
Figure 2:
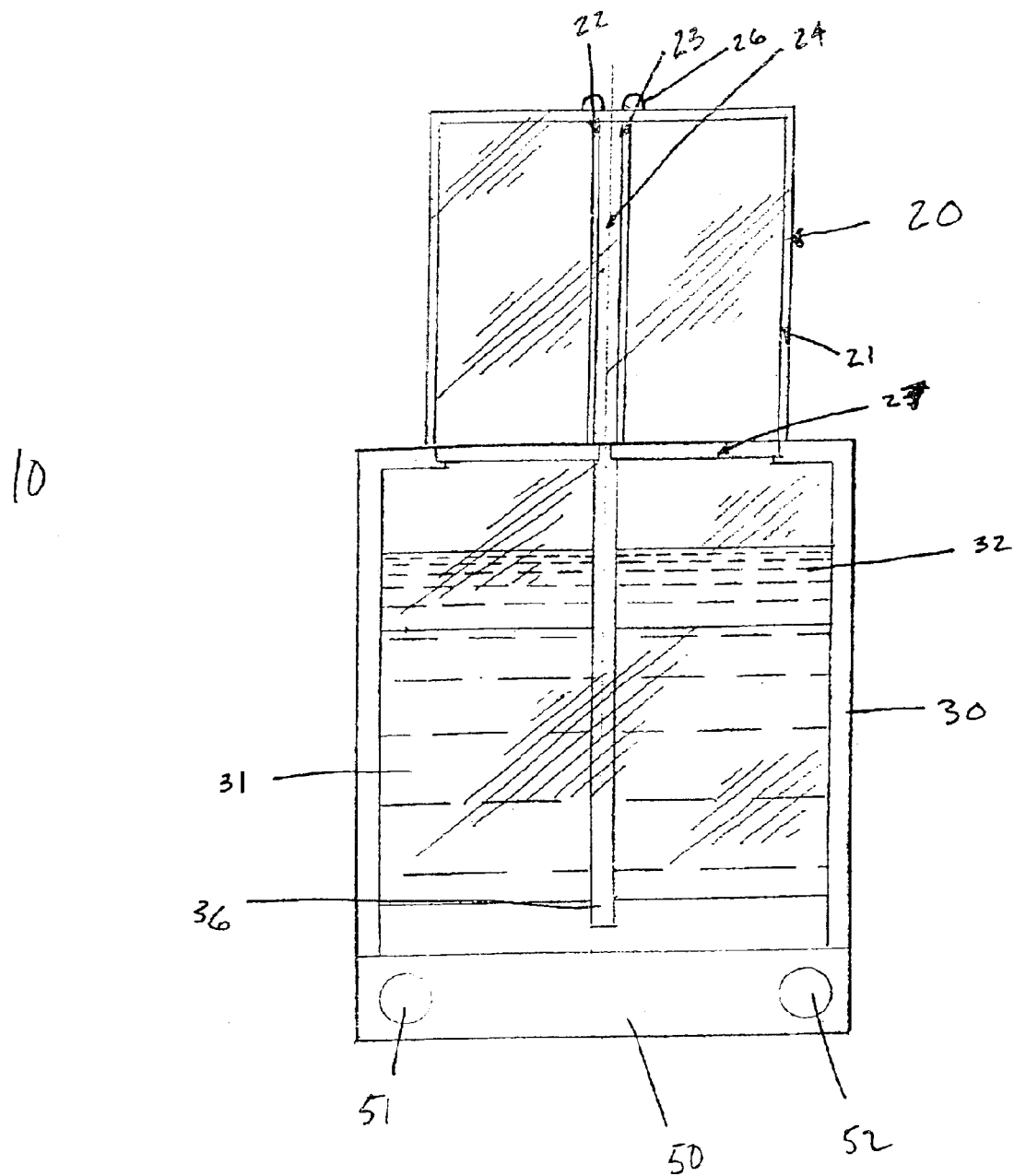
FIG. 2 is an illustration of the front view of the fuel cell device of FIG. 1.

Referring now to FIGS. 1 and 2, a preferred embodiment of the present invention is illustrated as the fuel cell device 10. The fuel cell device 10 has a glass casing 21 for electrical insulation. The fuel device 10 includes a first storage tank 11 for storing a hydrogen-based fuel, a second storage tank 12 for storing an oxidant, a fuel cell portion 20 having an electron input 26, an electrolysis portion 30 having an electron output 33, and an electrolyte recovery unit 40.

The first storage tank 11 is operatively engaged to the fuel cell portion 20 in a manner that allows for the hydrogen-based fuel to flow from the first storage tank 11 into a hydrogen storage section 21A of the fuel cell portion 20. Further, the first storage tank 11 has a pressure valve 13 to regulate fuel pressure within the first storage tank 11 and a flow control valve 14 to regulate fuel flow from the first storage tank 11 to the hydrogen storage section 21A of fuel cell portion 20. The hydrogen-based fuel can consist of hydrogen gas, hydrocarbons, hydrazine, and alcohol.

Second storage tank 12 is also operatively engaged in a manner that allows for the oxidant to flow from the first storage tank 11 into an oxidant storage section 21B of the fuel cell portion 20. Moreover, the second storage tank 12 also includes a pressure valve 13 to regulate oxidant pressure within the second storage tank 12 and a flow control valve 14 to regulate oxidant flow from the second storage tank 12 to the oxidant storage section 21B of fuel cell portion 20. The oxidant can consist of oxygen gas and air.

In the preferred embodiment, the fuel cell portion 20 further includes a pair of electrodes 22 and 23, one electrode being a cathode and the other being and anode. Displaced between the electrodes 22 and 23, and separating the hydrogen-based fuel storage section 21A from the oxidant storage section 21B, is an ion conducting membrane 24 that allows hydrogen ions from the hydrogen-based fuel to diffuse across and interact with oxygen ions from said oxidant. A glass separator 28 is used to prevent undesired contact between the hydrogen-based fuel and the oxidant, further functioning to separate the hydrogen-based fuel storage section 21A from the oxidant storage section 21B.

Figure 3:
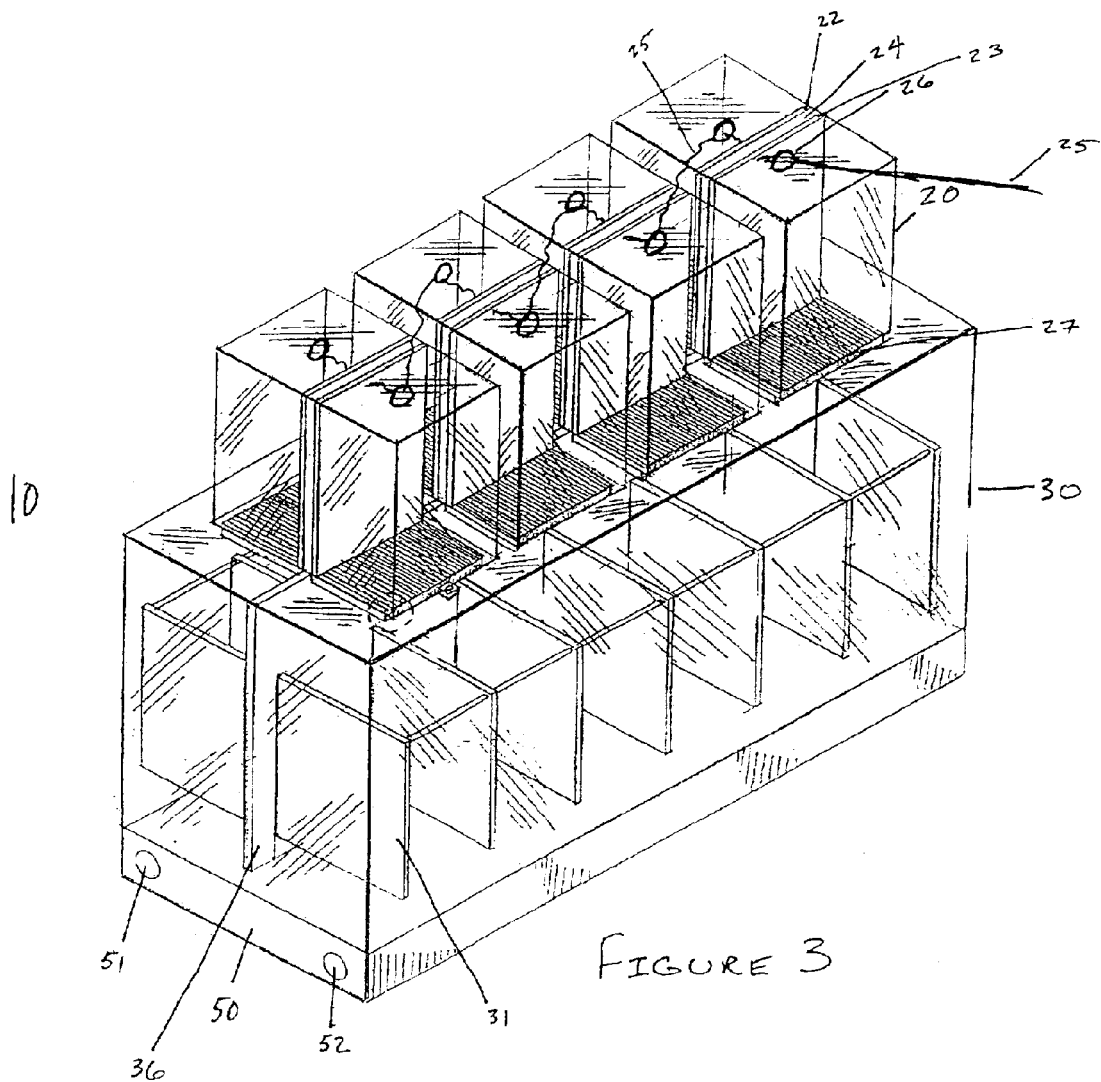
FIG. 3 is an illustration of a stacked arrangement of a plurality of the fuel cell devices of FIG. 2.
Figure 5:
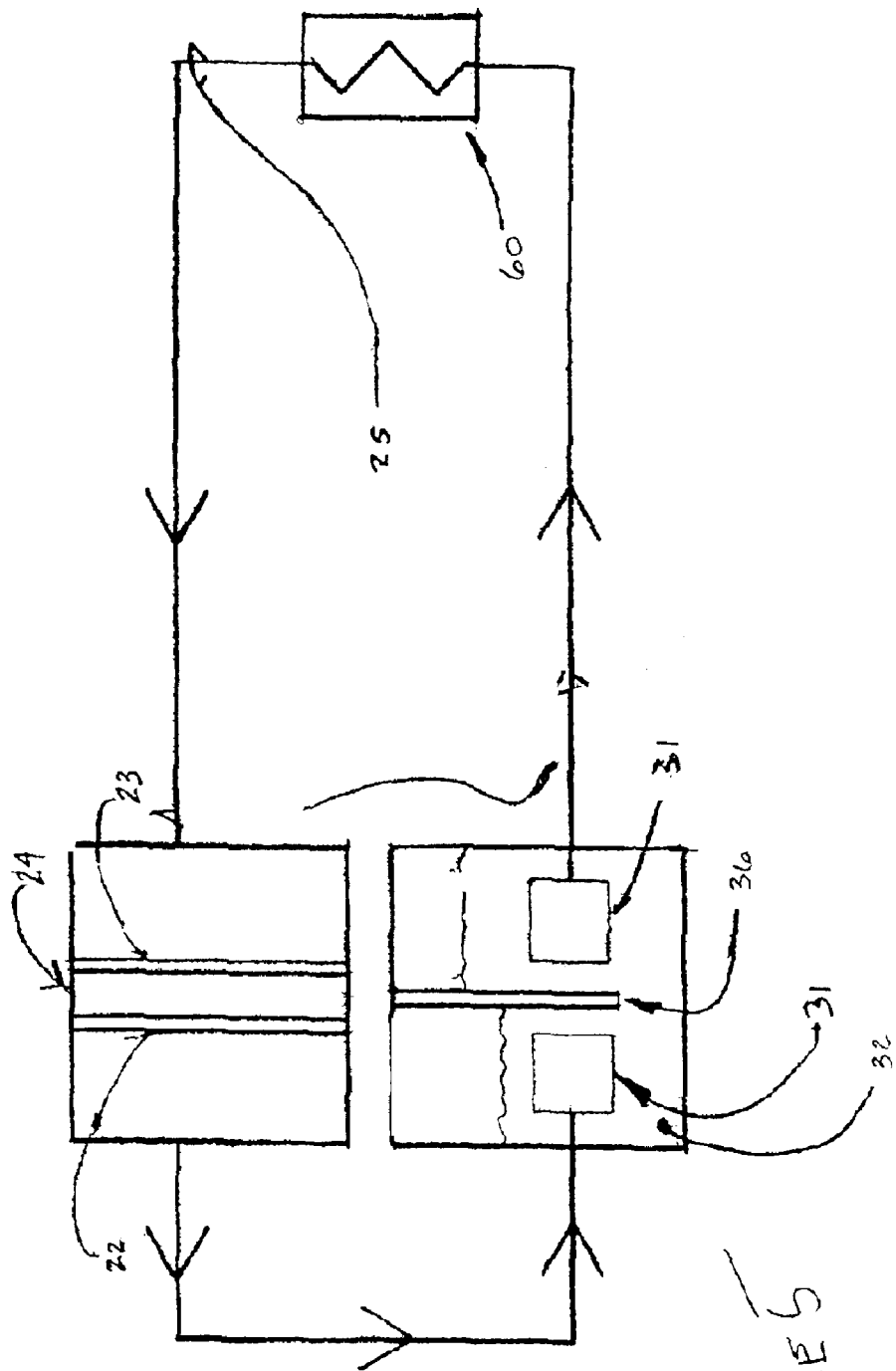
FIG. 5 is an illustration of a flow block diagram of the process by which the electrons flow through the fuel cell device of FIG. 1.

As illustrated in FIGS. 1, 3, and 5 of the preferred embodiment of the present invention, the external load 60 supplies electrons to the fuel cell portion 20. The electrons are supplied to the fuel cell portion 20 via the conductor wire 25 from the external load 60 through the electron input 26. The conductor wire 25 then supplies the electrons to the oxidant storage section 21B. In the preferred embodiment, the electrons pass from the oxidant storage section 21B to the hydrogen-based fuel storage section 21A by traversing the ion conducting membrane 24.

In accordance with the preferred embodiment, the electrons subsequently exit the hydrogen-based fuel storage section 21A through the conductor wire 25. The conductor wire 25 provides a pathway for the electrons to enter the electrolysis portion 30. The electrons then electrically engage the plate electrodes 31 and eventually exit the electrolysis portion 30 along the conductor wire 25 of the electron output 33.

In further accord with the preferred embodiment, the conductor wire ultimately routes the electrons back to the external load 60. Electrons are then recycled into the system through electron input 26 via a conductor wire 25. Preferably, the conductor wire 25 is made of platinum. In addition, the fuel cell device 10 combines said hydrogen-based fuel with the oxidant in the presence of electrons to produce electrical power and waste water. Furthermore, the fuel cell portion 20 is integrally connected to the electrolysis portion 30 so as to reduce electrical resistance.

Figure 4:
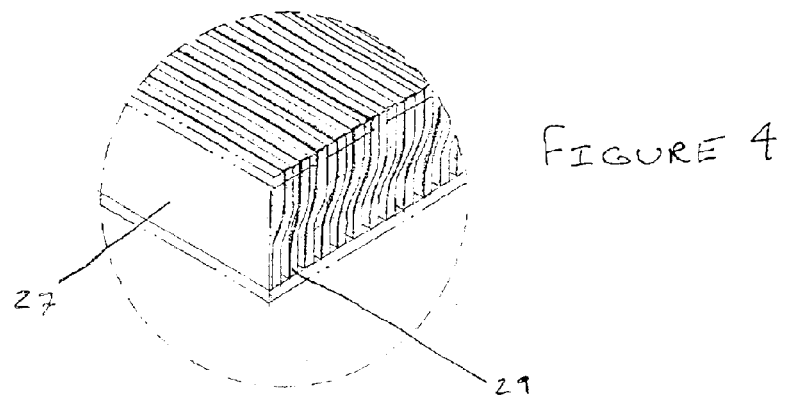
FIG. 4 is an illustration of the glass liquid separator of the fuel cell device of FIG. 3.

As shown in FIGS. 1 through 3, a glass liquid separator 27 at the bottom of the fuel cell portion 20 functions to provide waste water to the electrolysis portion through a series of channels 29, as well as to divide the fuel cell portion 20 from the electrolysis portion 30. FIG. 4 illustrates the channels 29 that are formed through the glass liquid separator 27. The channels 29 are porous to water and not to the electrolyte 32 of the electrolysis portion 30. Thus, waste water formed in the fuel cell portion 20 is transported into the electrolysis portion 30 through the channels 29 of the glass liquid separator 27 via diffusion.

Referring back to FIGS. 1 and 2, the electrolysis portion 30 itself further contains at least one plate electrode 31 for assisting in the electrolysis reaction. In addition, the electrolysis portion 30 contains an electrolyte 32 to further promote the electrolysis reaction. The electrolyte 32 is typically an acid, and preferably sulfuric acid. Moreover, the electrolysis portion 30 also includes an open glass separator 36 to allow the electrolyte 32 to flow between plate electrodes 31. As a result, the electrolysis portion 30 functions to split the waste water into hydrogen and oxygen. After splitting the waste water into hydrogen and water, the electrolysis portion 30 then recycles hydrogen to the first storage tank 11 and recycles oxygen to the second storage tank 12. Electrons are removed through an electron output 33 via the conductor wire 25 to the external load 60.

As shown in FIG. 1, the electrolysis portion 30 is operatively engaged to the electrolyte recovery unit 40. The electrolyte recovery unit 40 includes an overflow intake 34 to accept excess electrolyte 32. Furthermore, the electrolyte recovery unit 40 pumps the overflow electrolyte 32 via a return 35 to provide electrolyte flow back into the electrolysis portion 30. The return 35 of the electrolyte recovery unit 40 can also provide electrolyte flow to a third storage tank to be stored for future use.

As illustrated in FIGS. 1 through 3, the fuel cell device 20 further includes a heat exchanger 50 to control the temperature of the fuel cell 20. Cold water enters the heat exchanger 50 through water inlet 51, and the subsequently warmed water exits the heat exchanger 50 through water outlet 52.

Additionally, as illustrated in FIG. 3, the fuel cell device 20 may be stacked with other fuel cell devices to form a plurality of fuel cell devices to obtain a desired power output.

While the preferred embodiment of the present invention has been described in detail above, those skilled in the art will readily appreciate that numerous modifications are to the exemplary embodiment is possible without materially departing from the novel teachings and advantages of this invention. Accordingly, all such modifications are intended to be included within the scope of this invention as defined in the following claims.

What is claimed is:

1. A fuel cell device for providing electrical energy, said fuel cell device comprising:
    a first storage tank for storing a hydrogen-based fuel operatively engaged to a fuel cell portion having an electron input, said first storage tank having a first pressure valve to regulate fuel pressure within said first storage tank and a first flow control valve to regulate fuel flow from said first storage tank to said fuel cell portion;
    a second storage tank for storing an oxidant operatively engaged to said fuel cell portion, said second storage tank having a second pressure valve to regulate oxidant pressure within said second storage tank;
    an electrolysis portion having an electron output; and
    an electrolyte recovery unit;
    wherein said hydrogen-based fuel is selected from the group consisting essentially of hydrogen gas, hydrocarbons, hydrazine, and alcohol.

2. The fuel cell device according to claim 1 wherein said second storage tank has a second flow control valve to regulate oxidant flow from said second storage tank to said fuel cell portion.

3. The fuel cell device according to claim 2 wherein said oxidant is selected from the group consisting essentially of oxygen gas and air.

4. The fuel cell device according to claim 1 wherein said fuel cell portion is integrally connected to said electrolysis portion and wherein said fuel cell portion further comprises:
    at least one electrode, said at least one electrode one of a cathode or an anode;
    an ion conducting membrane to allow hydrogen ions from said hydrogen-based fuel to diffuse across said membrane to interact with oxygen ions from said oxidant; and
    a glass separator to prevent undesired contact between said hydrogen-based fuel and said oxidant.

5. The fuel cell device according to claim 4 wherein said fuel cell portion further comprises a glass liquid separator to divide said fuel cell portion from said electrolysis portion.

6. The fuel cell device according to claim 5 wherein said electron input is a conductor wire.

7. The fuel cell device according to claim 6 wherein said conductor wire is platinum.

8. The fuel cell device according to claim 1 wherein said fuel cell combines said hydrogen-based fuel with said oxidant to produce electrical power and waste water and wherein said electrolysis portion further comprises at least one plate electrode and an electrolyte, and wherein said electrolyte is an acid.

9. The fuel cell device according to claim 8 wherein said acid is sulfuric acid.

10. The fuel cell device according to claim 9 wherein said electrolysis portion further comprises an open glass separator.

11. The fuel cell device according to claim 10 wherein said electrolysis portion splits said waste water into hydrogen and oxygen.

12. The fuel cell device according to claim 11 wherein said electrolysis portion provides hydrogen to said first storage tank.

13. The fuel cell device according to claim 11 wherein said electrolysis portion provides oxygen to said second storage tank.

14. The fuel cell device according to claim 11 wherein said electron output is a conductor wire.

15. The fuel cell device according to claim 14 wherein said electrolysis portion is operatively engaged to said electrolyte recovery unit.

16. The fuel cell device according to claim 1 wherein said electrolyte recovery unit further comprises an overflow intake to accept excess electrolyte.

17. The fuel cell device according to claim 16 wherein said electrolyte recovery unit further comprises a return to provide electrolyte flow into said electrolysis portion.

18. The fuel cell device according to claim 16 wherein said electrolyte recovery unit further comprises a return to provide electrolyte flow to a third storage tank for future use.

19. The fuel cell device according to claim 1 wherein said fuel cell device further comprises a heat exchanger to control the temperature of said fuel cell.

20. A method for generating electrical energy using a fuel cell device having a fuel cell portion and an electrolysis portion comprising:

storing a hydrogen-based fuel in a first storage tank, wherein a first pressure valve controls fuel pressure within said first storage tank, and wherein a first flow control valve controls the supply of said hydrogen-based fuel from said first storage tank to a fuel cell portion;

storing an oxidant in a second storage tank, wherein a second pressure valve controls oxidant pressure within said second storage tank, and wherein a second flow control valve controls the supply of said oxidant from said first storage tank to said fuel cell portion;

supplying said hydrogen-based fuel, said oxidant, and electrons to said fuel cell portion, wherein a conductor wire supplies electrons to said fuel cell portion;

combining said hydrogen-based fuel and said oxidant in said fuel cell portion to generate electrical energy and waste water;

supplying said waste water to said electrolysis portion having an electrolyte;

splitting said waste water into hydrogen and oxygen;

supplying said hydrogen from said electrolysis portion to said first storage tank;

supplying said oxygen from said electrolysis portion to said second storage tank; providing flow of said electrolyte to an electrolyte recovery pump, said flow being redirected.

21. The method according to claim 20 wherein said conductor wire is platinum.

22. The method according to claim 20 wherein said electrolyte further comprises unreacted waste water.

23. The method according to claim 20 wherein said electrolyte recovery unit redirects electrolyte flow to said electrolysis portion.

24. The method according to claim 20 wherein said electrolyte recovery unit redirects electrolyte flow to a third storage tank.

25. The method according to claim 20 wherein said method further comprises the step of controlling the temperature of said fuel cell device.

26. The method according to claim 25 wherein said controlling is performed by a heat exchanger.

* * * * *